United States Patent Office 2,921,956
Patented Jan. 19, 1960

2,921,956
1,4a - DIMETHYL - 6 - OXOPERHYDROPHENAN-THRENE-1-CARBOXYLIC ACID AND RELATED COMPOUNDS

Roy H. Bible, Jr., Morton Grove, and Willard M. Hoehn, Wilmette, Ill., assignors to G. D. Searle & Co., Chicago, Ill., a corporation of Delaware No Drawing. Application June 17, 1957
Serial No. 666,219

7 Claims. (Cl. 260—468.5)

The present invention is concerned with polycyclic ketones related to perhydrophenanthrene. More particularly, it is concerned with compounds which can be represented by the structural formula

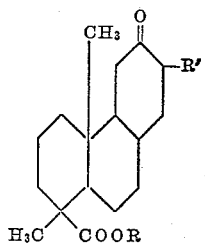

wherein the terms R and R' can each represent hydrogen or a lower alkyl radical. Such alkyl radicals are straight- or branched-chain alkyl radicals containing fewer than nine carbon atoms.

In the manufacture of compositions of this invention in which the term R' represents hydrogen, a useful starting material is 1,4a - dimethyl - 6-hydroxyperhydrophenanthrene-1-carboxylic acid, described in copending application Serial No. 443,974, filed July 16, 1954, which issued on June 18, 1957, as U.S. Patent 2,796,431, of which the present application is a continuation-in-part.

Oxidation of this compound with chromium trioxide in aqueous acetic acid affords 1,4a-dimethyl-6-oxoperhydrophenanthrene-1-carboxylic acid. Alkyl esters of this compound can be obtained by esterification with appropriate alkylating reagents. Suitable for this purpose are dialkyl sulfates, in reaction media comprising a lower alkanol and an alkali metal hydroxide.

Starting materials useful in the manufacture of representative compositions in which the term R' represents a lower alkyl radical are the 7-alkanoylpodocarpic acids of the structural formula

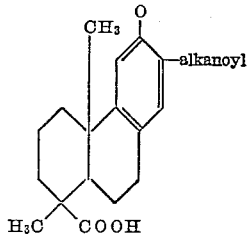

Such compounds, obtainable by the aluminum chloride-catalyzed reaction of methyl O-methylpodocarpate with a lower alkanoyl chloride, followed by cleavage of the ether and ester groups, undergo hydrogenation in the presence of a noble metal catalyst such as rhodium supported on alumina. The hydrogenation proceeds with the saturation of the aromatic ring and the conversion of the alkanoyl radical to an alkyl radical having the same carbon skeleton. Subsequent oxidation with chromium trioxide in aqueous acetic acid then affords a 1,4a-dimethyl - 6 -oxo-7-alkylperhydrophenanthrene-1-carboxylic acid, which is converted to a lower alkyl ester by treatment with a dialkyl sulfate in methanolic sodium hydroxide.

Alternatively, for the manufacture of compounds of this invention in which the term R' represents methyl, methyl O-methylpodocarpate is converted to the 7-chloromethyl derivative by reaction with formaldehyde and hydrochloric acid. The chloromethyl group is converted to the methyl group by hydrogenation in the presence of a palladium catalyst, and the ether and ester groups are cleaved in a manner described hereinafter. Hydrogenation in the presence of rhodium on alumina catalyst then affords, 1,4a - dimethyl-6-hydroxy-7-methylperhydrophenanthrene-1-carboxylic acid, which is converted to the corresponding 6-ketone by oxidation with chromium trioxide in aqueous acetic acid.

The compounds of the present invention have hormonal, as well as other valuable pharmacological properties. They have anti-inflammatory properties, and relieve the hyperemia present in inflammation of the iris. They are anabolic agents which can be employed to promote the metabolic retention of nitrogen. In addition, they are anti-hypertensive agents, effective in reducing elevated blood pressure.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrate (° C.), distillation pressures in millimeters (mm.) of mercury, and quantities of materials in parts by weight.

Example 1

A stirred mixture of 100 parts of 1,4a-dimethyl-6-hydroxyperhydrophenanthrene-1-carboxylic acid and 1050 parts of acetic acid is heated to about 60–80° C. until most of the starting material dissolves. It is then rapidly cooled and maintained at about 15–20° C. while a solution of 26.2 parts of chromium trioxide in 15.6 parts of water and 70 parts of acetic acid is added gradually over a period of about an hour. Starting material which separates as the solution is chilled tends to redissolve during the addition of the chromium trioxide solution. Stirring is continued for an additional 5 hours at about 20–25° C., following which 20 parts of methanol is slowly added. The reaction mixture is concentrated almost to dryness by distillation under reduced pressure. The residue is stirred with ether and hydrochloric acid until almost all of the solid is dissolved. The ethereal solution, combined with an ether extract of the hydrochloric acid solution, is washed with dilute hydrochloric acid and with water. It is then extracted with 10% sodium hydroxide solution, and the combined basic extract is acidified with hydrochloric acid to afford a precipitate which solidifies upon standing and cooling. This product is collected on a filter and washed with water. Purification by crystallizations from aqueous ethanol followed by sublimation or evaporative distillation at about 0.1 mm. yields 1,4a-dimethyl-6-oxoperhydrophenanthrene-1-carboxylic acid which melts at about 171–176° C. and has a specific rotation of about +35° in ethanol solution. The structural formula is

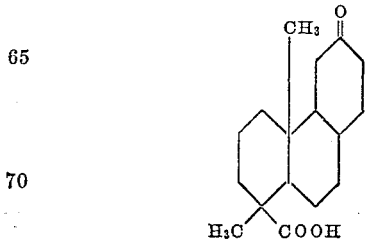

The same ketone can be obtained by the oxidation of 1,4a - dimethyl - 6 - hydroxyperhydrophenanthrene-1-carboxylic acid with acidic sodium dichromate solution.

Example 2

A solution is prepared by dissolving 100 parts of 1,4a-dimethyl-6-oxoperhydrophenanthrene-1-carboxylic acid in 360 parts of methanol. There is added a 10% sodium hydroxide solution containing a total of 15 parts of sodium hydroxide, followed by 46 parts of dimethyl sulfate, and the reaction mixture is heated under reflux for 5 minutes and cooled. The addition of the same quantities of 10% sodium hydroxide solution and dimethyl sulfate is repeated two more times, in each case with moderate cooling to dissipate the heat of the reaction. The insoluble reaction product is collected on a filter and washed with water. This product is purified by crystallizations from aqueous methanol or from petroleum ether to afford 1,4a-dimethyl-1-methoxycarbonylperhydro-6-phenanthrone which has a specific rotation of about +41° in ethanol solution. The melting point commonly observed is about 121.5–122° C., although a crystalline form melting at about 109.5–110.5° C. can also be encountered. The structural formula is

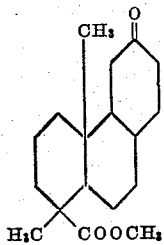

By the foregoing procedure, with the substitution of a total of 168 parts of diethyl sulfate, in three equal portions, for the 138 parts of dimethyl sulfate, the compound obtained is 1,4a - dimethyl - 1 - ethoxycarbonylperhydro - 6-phenanthrone.

Example 3

Pyridine hydrochloride (250 parts) is placed in a round-bottomed flask and a distillation is carried out until the vapor temperature reaches about 215° C. The forerun which is collected in this manner is discarded, and 20 parts of methyl O-methyl-7-acetylpodocarpate is added to the pyridine hydrochloride remaining in the distillation flask. This mixture is heated under partial reflux for 1 hour in such a manner that excess pyridine is allowed to escape from the reaction vessel. The mixture is then cooled and diluted to several times its volume with water. The precipitated product is collected on a filter and washed with a small quantity of dilute hydrochloric acid and then with copious amounts of water. When this reddish-brown solid is purified by sublimation followed by recrystallization from acqueous methanol, there are obtained well-formed crystals of 7-acetylpodocarpic acid melting at 213.5–216° C. This compound has the structural formula

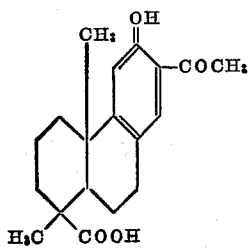

Example 4

7-acetylpodocarpic acid is hydrogenated by the following procedure. A mixture of 25 parts of 7-acetylpodocarpic acid, 130 parts of acetic acid and 2.5 parts of 5% rhodium on alumina catalyst is placed in a medium- or high-pressure reaction vessel and subjected to a hydrogen pressure of about 1000 pounds per square inch at a temperature of about 70–80° C. As the hydrogen is consumed and the pressure drops, periodic refills of hydrogen are made to restore the pressure to about 1000 pounds per square inch. After 7 hours, the catalyst is removed by filtration of the cooled mixture. A fresh portion of 2.5 parts of 5% rhodium on alumina catalyst is added to the filtrate, and hydrogenation under the same conditions is continued for an additional 3 hours, or until the consumption of hydrogen becomes very slow. (When a test portion of the reaction mixture is filtered and brought to dryness, the residue should not give more than a trace amount of a 2,4-dinitrophenylhydrazone; if a substantial quantity of such a ketone derivative is obtained, the hydrogenation should be repeated until the test is essentially negative.) The reaction mixture is filtered, and the filtrate is brought to dryness by vaporization of the acetic acid. The residue, which is an almost colorless glass, is dissolved in a small quantity of benzene, and the solution is poured on a chromatography column prepared from 1700 parts of silica. The column is eluted with benzene and with mixtures of benzene and ethyl acetate containing gradually increasing proportions of ethyl acetate. The principal product of the reaction commonly amounts to about 10–12 parts, and can be eluted from the column at a satisfactory rate with a 5 volume percent solution of ethyl acetate in benzene. This principal product appears after other crystalline fractions are eluted from the column. After crystallizations from aqueous methanol, the principal product melts at about 177–179.5° C. It is 1,4a-dimethyl-6-hydroxy-7-ethylperhydrophenanthrene-1-carboxylic acid which has the structural formula

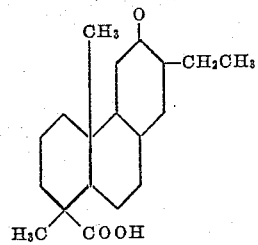

The same compound is obtained in lower yield when the hydrogenation is conducted with platinum oxide catalyst instead of rhodium on alumina.

Example 5

With external cooling as required to moderate the exothermic reaction and keep the reaction temperature below about 30° C., a solution of 2.1 parts of chromium trioxide in 1.3 parts of water and 5 parts of acetic acid is gradually added to a stirred suspension of 8.7 parts of 1,4a-dimethyl-6-hydroxy-7-ethylperhydrophenanthrene-1-carboxylic acid in 105 parts of acetic acid. After the addition is complete, stirring is continued for an additional 4 hours at about 25° C. The resulting clear solution is poured into several times its volume of water, and the precipitated product is collected on a filter and washed with water. By crystallizations from aqueous methanol containing dilute hydrochloric acid and then from aqueous methanol, there is obtained 1,4a-dimethyl-6-oxo-7-ethylperhydrophenanthrene-1-carboxylic acid as a preparation melting at about 181.5–191.5° C. and exhibiting a specific rotation of about +50° in ethanol solution. The structural formula is

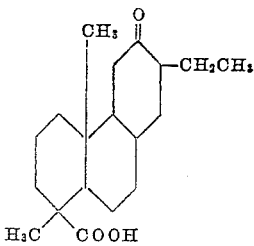

By the dimethyl sulfate esterification procedure of Example 2, with the substitution of 110 parts of this compound for the 1,4a-dimethyl-6-oxoperhydrophenanthrene-1-carboxylic acid, the compound obtained is 1,4a-dimethyl-1-methoxycarbonyl-7-ethylperhydro-6-phenanthrone.

*Example 6*

A stirred mixture of 302.4 parts of methyl O-methylpodocarpate and 1100 parts of chlorobenzene is maintained at about 10° C. and treated by the gradual addition of 273 parts of aluminum chloride. The mixture is stirred for 10 minutes after the addition of the aluminum chloride has been completed, and then there is gradually added a solution of 185 parts of propionyl chloride in 155 parts of chlorobenzene. The stirred reaction mixture is maintained at about 10–15° C. during this period of addition and for 3 hours thereafter, after which the reaction mixture is allowed to stand at room temperature for 16 hours. It is then poured into 1500 parts of ice water containing 210 parts of concentrated hydrochloric acid. The chlorobenzene is removed by distillation with steam, and the residual aqueous suspension is chilled until crystallization is complete. The solid product is collected and purified by repeated recrystallization from methanol to yield methyl O-methyl-7-propionylpodocarpate melting at 102–103° C.

To a stirred mixture of 8 parts of aluminum chloride in 110 parts of chlorobenzene there is added a solution of 10 parts of methyl O-methyl-7-propionylpodocarpate in 55 parts of chlorobenzene. Stirring is continued and the mixture is maintained at about 80° C. for an additional hour, after which it is cooled and poured into ice-water. Dilute hydrochloric acid and benzene washings of the reaction vessel are added, and the organic solvents are removed by distillation under reduced pressure. The product remaining is then separated and washed by decantation with several portions of water. Purification by recrystallization from aqueous methanol then affords methyl 7-propionylpodocarpate melting at 98–99.5° C.

Methyl 7-propionylpodocarpate (3 parts) is dissolved by stirring it with 28 parts of concentrated sulfuric acid for about 10 minutes. The solution is then cautiously poured into 75 parts of water, and the resulting suspension is chilled and filtered. The solid product is washed with water and then recrystallized from aqueous methanol to yield 7-propionylpodocarpic acid melting at 145–147° C.

Hydrogenation of 7-propionylpodocarpic acid according to the procedure of Example 4 yields 1,4a-dimethyl-6-hydroxy-7-propylperhydrophenanthrene-1-carboxylic acid. By the substitution of 9.1 parts of this compound for the 1,4a-dimethyl-6-hydroxy-7-ethylperhydrophenanthrene-1-carboxylic acid in the procedure of Example 5, the compound obtained is 1,4a-dimethyl-6-oxo-7-propylperhydrophenanthrene-1-carboxylic acid. This compound exhibits prominent infrared absorption maxima at about 5.85, 6.82, and 7.06 microns. The structural formula is

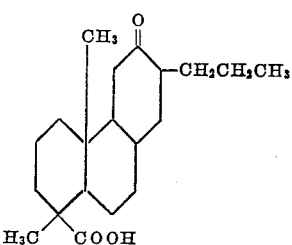

What is claimed is:
1. A compound of the structural formula

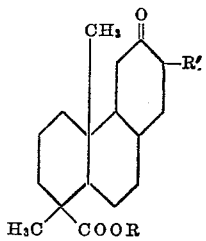

wherein R and R' are members of the class consisting of hydrogen and lower alkyl radicals.

2. 1,4a-dimethyl-6-oxoperhydrophenanthrene-1-carboxylic acid.

3. 1,4a-dimethyl-1-(lower)alkoxycarbonylperhydro-6-phenanthrone.

4. 1,4a-dimethyl-1-methoxycarbonylperhydro-6-phenanthrone.

5. 1,4a-dimethyl-6-oxo-7-(lower)alkylperhydrophenanthrene-1-carboxylic acid.

6. 1,4a-dimethyl-6-oxo-7-ethylperhydrophenanthrene-1-carboxyl acid.

7. 1,4a-dimethyl-1-(lower)alkoxycarbonyl-7-(lower)alkylperhydro-6-phenanthrone.

References Cited in the file of this patent
UNITED STATES PATENTS

| | | |
|---|---|---|
| 2,785,184 | Sanderson | Mar. 12, 1957 |
| 2,796,431 | Bible | June 18, 1957 |

OTHER REFERENCES

King et al.: Chem. Abst. 49, 6945e (1955), citing J. Chem. Soc., 4158–68 (1953).